United States Patent [19]

Freshman, Jr.

[11] Patent Number: 4,729,054

[45] Date of Patent: Mar. 1, 1988

[54] LOW VOLTAGE BURIED WIRE ISOLATOR

[76] Inventor: Robert M. Freshman, Jr., 1111 Terrace, Nebraska City, Nebr. 68410

[21] Appl. No.: 880,277

[22] Filed: Jun. 30, 1986

Related U.S. Application Data

[63] Continuation-in-part of Ser. No. 612,635, May 21, 1984, Pat. No. 4,603,369.

[51] Int. Cl.⁴ ............................................. H02H 1/04
[52] U.S. Cl. .................................. 361/119; 361/111; 174/78
[58] Field of Search ................. 361/58, 107, 108, 111, 361/112, 113, 117, 118, 119, 120; 174/2, 5 SG, 78

[56] References Cited

U.S. PATENT DOCUMENTS

| | | | |
|---|---|---|---|
| 2,959,633 | 11/1960 | Palmer | 174/50 |
| 3,033,913 | 5/1962 | Dietze | 174/50 |
| 3,168,613 | 2/1965 | Palmer | 174/50 |
| 3,310,712 | 3/1967 | Paddock | 361/124 |
| 3,568,128 | 3/1971 | Taylor | 339/14 |
| 3,851,220 | 11/1974 | Charles | 361/120 |
| 4,009,421 | 2/1977 | Splitt | 361/120 X |
| 4,264,940 | 4/1981 | Castle | 361/91 |

FOREIGN PATENT DOCUMENTS 1119119 10/1984 U.S.S.R. ............................. 361/119

OTHER PUBLICATIONS

Thompson Lightning Protection Inc., Technical Manual, Jul. 1969, pp. 16–18, paragraphs 47 and 60.

*Primary Examiner*—A. D. Pellinen
*Assistant Examiner*—H. L. Williams
*Attorney, Agent, or Firm*—Zarley, McKee, Thomte, Voorhees & Sease

[57] ABSTRACT

A low voltage buried wire isolator for interrupting the metallic path between the common grounding system in a structure and the positive grounding system of the telephone or television cable grounding systems. The isolator comprises a housing having an electrically conductive clamping assembly clamped to the metal ground sheath of the service cable. A high voltage protector such as a gas tube is electrically connected, at one of its ends, to the clamping assembly and is designed to normally prevent the flow of electrical current therethrough which is below a predetermined value. A metal fitting is connected to the other end of the high voltage protector and is operatively electrically connected to at least a pair of signal circuit protectors also mounted within the housing. If a power crossover should occur, the high voltage protector prevents the metal ground sheath from overheating since it is electrically insulated from the cable protective apparatus. If a power surge should occur in the service wire, the signal circuit protectors within the housing prevent damage to the equipment within the dwelling.

2 Claims, 6 Drawing Figures

LOW VOLTAGE BURIED WIRE ISOLATOR

CROSS-REFERENCE TO RELATED APPLICATION

This is a continuation-in-part patent application of copending patent application Ser. No. 612,635 filed on May 21, 1984 which issued on July 19, 1986, as U.S. Pat. No. 4,603,369.

BACKGROUND OF THE INVENTION

This invention relates to a low voltage buried wire isolator and more particularly to an isolator designed to eliminate a potential fire hazard in telephone and television cable wiring.

In most dwellings, cable television wires, telephone wires, and electrical power wires are mutually grounded to a metal water pipe. The problem associated with the mutual grounding of the television, telephone and electrical wires is that the same provides a zero potential difference for returning electricity to ground. In the event of a power crossover from any of the utilities, the current resulting from the same can damage the telephone or cable television equipment. The power crossover can also cause overheating of the metal sheath surrounding the wire which can lead to spontaneous combustion of the material in contact with the mtal sheath. Such combustion can cause severe damage to the area surrounding the cable.

This condition, power seeking a ground through the telephone or television cable service wire sheaths, will occur in the event of a disruption impairment and/or absence of electrical power bonding of the neutral/ground service link from the structure to the power feed or anywhere within the power feed gradient.

In applicant's copending application, a low voltage buried wire isolator was described which was operatively connected to a conventional signal circuit protector which had been previously installed in or on the existing building structure. The instant invention is designed to combine the low voltage buried wire isolator of the previous invention with a signal circuit protector in a single housing, and which is particularly well-suited for installation on new construction.

It is therefore a principal object of the invention to provide a low voltage buried wire isolator.

A further object of the invention is to provide a low voltage buried wire isolator which interrupts the metallic path presently existing between the common grounding system used in and around structures and the positive grounding system of the telephone and television cable grounding systems.

A further object of the invention is to provide a low voltage buried wire isolator which may be easily installed in existing structures having telephone or television cables extending thereinto.

Yet another object of the invention is to provide a low voltage buried wire isolator including a high voltage protector means therein designed to normally prevent the flow of electrical current therethrough which is below a predetermined value.

Still another object of the invention is to provide an apparatus wherein a low voltage buried wire isolator and a signal circuit protector are combined in a single housing.

Yet another object of the invention is to provide a low voltage buried wire isolator which is economical of manufacture and durable in use.

These and other objects will be apparent to those skilled in the art.

SUMMARY OF THE INVENTION

A low voltage buried wire isolator is provided for interrupting the metallic path presently occurring between the common grounding system used around structures and the positive grounding system of the telephone and television cable grounding systems. The isolator includes a housing having an electrically conductive clamping assembly which is clamped to the metal ground sheath of the cable. The discharge side of a high voltage protector means such as a gas tube or carbon protector is electrically connected to the clamping assembly and the input side thereof is electrically connected to a ground terminal and a grounding circuit. The protector means is designed to normally prevent the flow of electrical current, below a predetermined value, therethrough. At least first and second circuit protectors are also provided in the housing and have their input sides connected to the conductive wires of the telephone or television cable. The discharge side of the protector units are operatively connected to the ground terminal. The protector units are designed to provide at least a momentary path to ground through the ground temrinal and grounding circuit when a power surge is experienced in the conductive wires. In the event of a power cross-over or the like, current is prevented from flowing into the metal sheath of the service wire or cable by means of the gas tube or carbon protector.

DESCRIPTION OF THE PREFERRED EMBODIMENT

Figure 1:
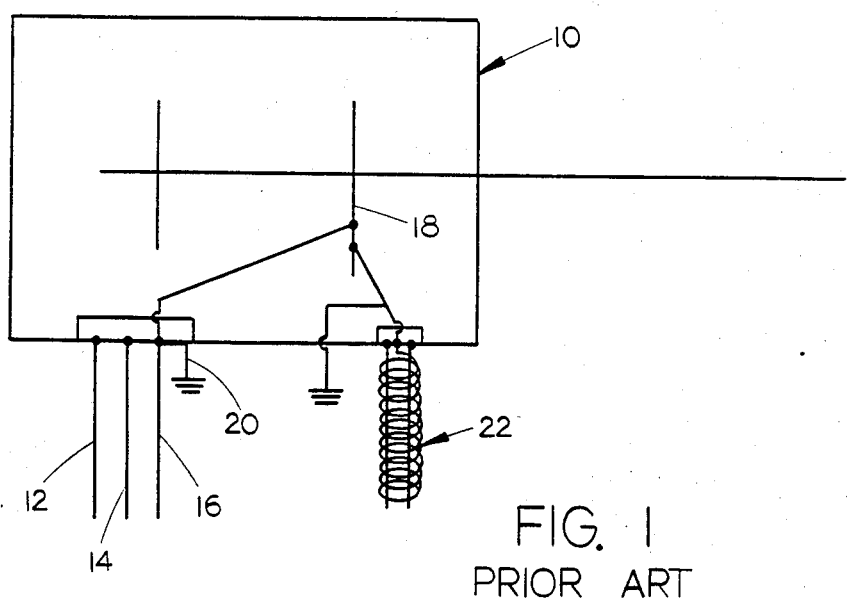
FIG. 1 is a schematic view illustrating the prior art grounding system of a structure having a telephone cable extending thereinto.

FIG. 1 is a schematic view of the typical grounding system in a dwelling or structure 10. The power lines 12, 14 and 16 enter the house in conventional fashion with the ground wire 16 being grounded to a water pipe 18. Normally, the ground wire 16 may also be connected to a grounding rod 20 which is placed in the earth adjacent the dwelling.

Figure 2:
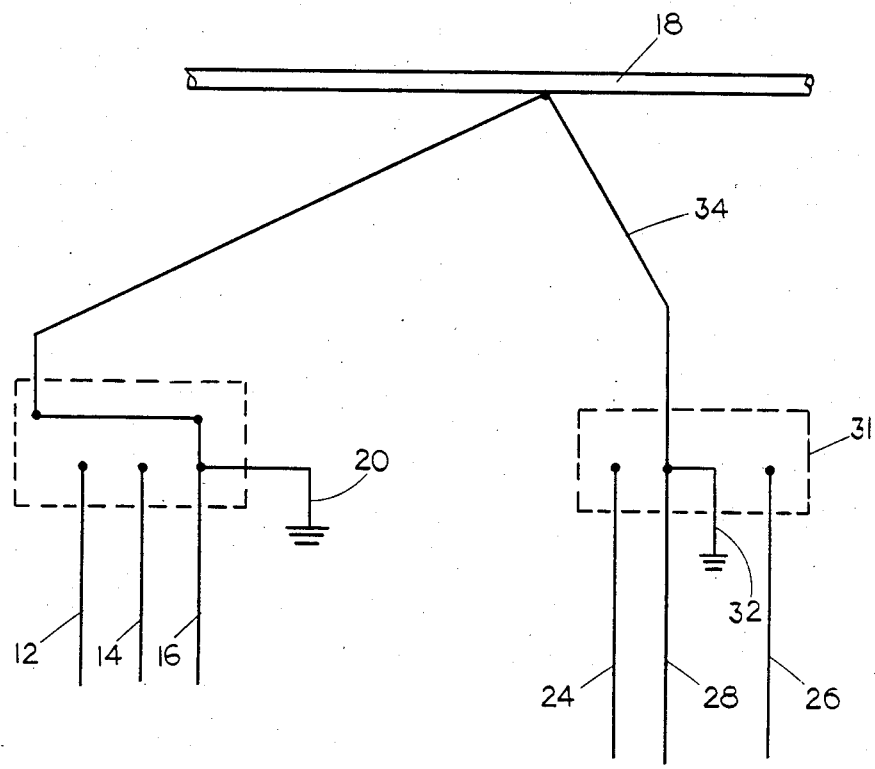
FIG. 2 is an enlarged schematic of the prior art grounding system of FIG. 1.
Figure 3:
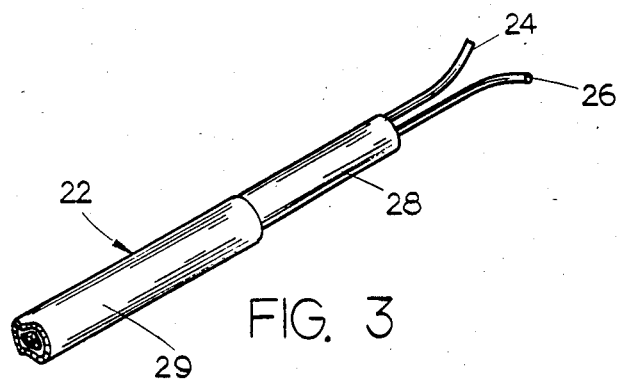
FIG. 3 is a partial perspective view of a service wire.
Figure 4:
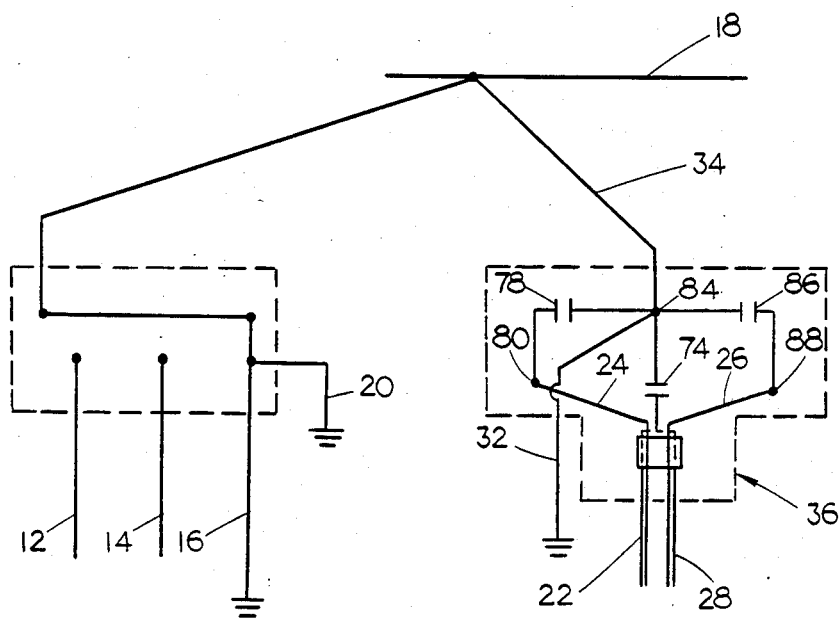
FIG. 4 is a schematic view illustrating the low voltage buried wire isolator of this invention connected to the grounding system of a dwelling.
Figure 6:
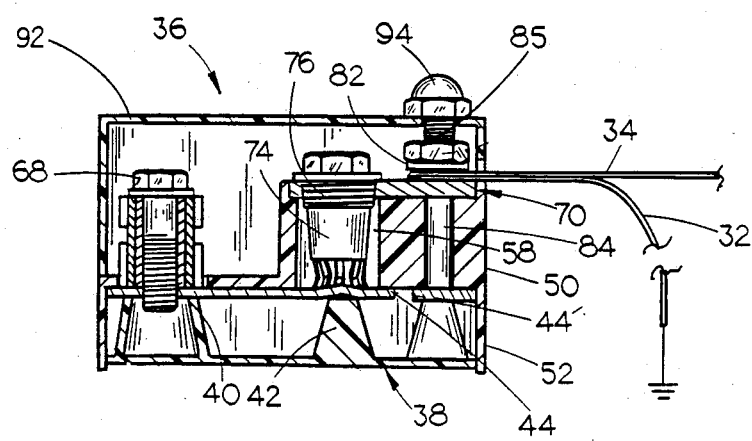
FIG. 6 is a sectional view of the isolator of FIG. 5.

The numeral 22 refers to a service wires such as a telephone wire or television cable which enters the dwelling as viewed in FIG. 1. For purposes of description, the service wire 22 will be described as being a telephone service wire including conductor wires 24 and 26 surrounded by a metal sheath 28 and an insulation covering material 29 as shown in FIG. 3. Sheath 28 forms the ground for the service wire. The wires 24 and 26 as well as the sheath 28 are normally connected to a signal circuit or lightning protector 31. Sheath 28 may also be connected to a grounding rod 32 as desired. As seen in Figure 2, the metal sheath 28 is electrically connected to the water pipe 18 by means of lead 34.

In the event that ground should be lost through the water pipe 18 or if there is a power crossover for some other reason, high amperage current will pass through lead 34 into the metal sheath 28. The high amperage current passing into sheath 28 can cause overheating of the sheath and cause spontaneous combustion of the area surrounding the sheath or the material surrounding the sheath. The low voltage buried wire isolator of applicant's copending application was provided to eliminate the typical connection between the metal sheath of the service wire and the lightning protector. The instant invention combines the low voltage buried wire isolator of applicant's copending application and the signal circuit protector 31.

The improved isolator or protector of this invention is referred to generally by the reference numeral 36 and includes a non-electrically conductive bae plate 38 having a hollow boss 40 extending upwardly from one end thereof and solid bosses 42 extending upwardly therefrom inwardly of the other end thereof. A metallic bonding clip conductor plate 44 is positioned on the boss 40 and one of the bosses 42 so that the threaded opening 46 is positioned over the boxx 40 and so that the indented portions 48 are positioned over bosses 42. A metallic conductor plate 44' is positioned on two of the bosses 42 so that the indented portions 48' are positioned thereon as seen in the drawings.

Figure 5:
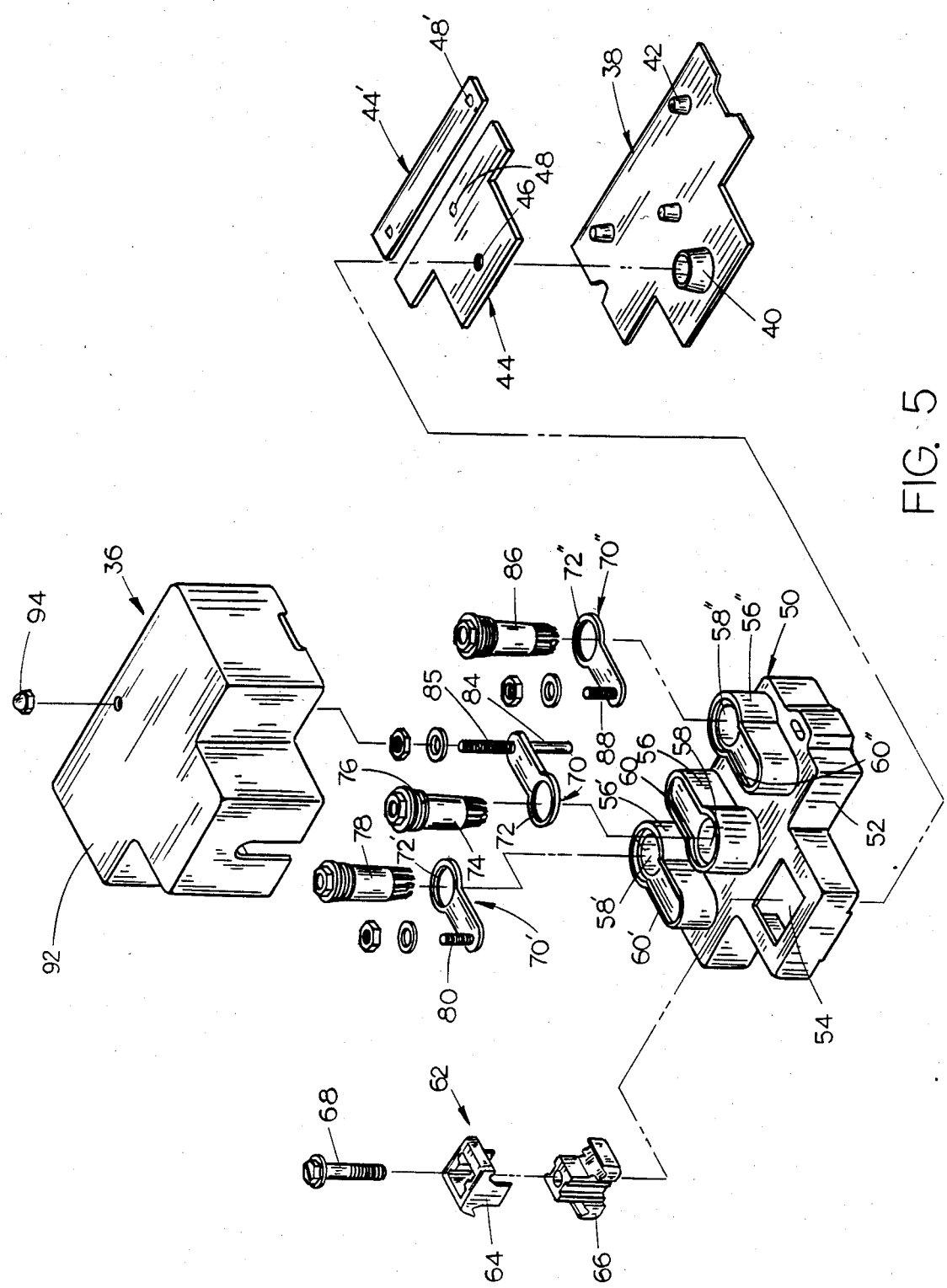
FIG. 5 is an exploded perspective view of the low voltage buried wire isolator of this invention.

Base 50 embraces plates 44, 44' and 38 as seen in Figure 5. The lower end of skirt portion 52 of base 50 is heat-sealed or otherwise bonded to the periphery of the base plate 38 in conventional fashion. As seen in the drawings, base 50 includes an opening 54 formed therein and upstanding supports 56, 56' and 56". Supports 56, 56' and 56" are provided with openings 58, 58' and 58" which extend downwardly therethrough. The supports 56, 56' and 56" also include recessed portions 60, 60' and 60", respectively.

Bonding clip assembly 62 comprised of clip 64, clip 66 and bolt 68 is provided for connection to the metal sheath of the cable but the bonding clip assembly 62 could be replaced by a conventional stud type terminal if so desired. The lower portion of clip 66 rests on plate 44 through opening 54 so as to be in electrical contact with plate 44. The cable 22 is positioned between the clips 64 and 66 and a portion of the insulation material 29 is cut away to expose the metallic sheath 28 so that the sheath 28 will be in electrical contact with the bonding clip assembly 62. Bolt 68 extends downwardly through clips 64 and 66 and is threadably received by threaded poening 46 to positively maintain the cable 22 between the clips 64 and 66 and to positively maintain the bonding clip assembly 62 in electrical contact with the conductor plate 44.

Tube mounting and ground stud assemlby 70 is positioned in the recessed portion 60 of support 56 so that threaded opeing 72 is positioned over opening 58. A gas tube or carbon protector 74 has its electrically conductive upper end 76 threadably received by opening 72 as seen in the drawings. Gas tube 74 is of conventional design and preferably prevents the flow of current therethrough below a predetermined level. As seen in the drawings, the lower end of the gas tube 74 is in electrical contact with the indented portion 48 of conductor plate 44. Preferably, tube mounting and ground stud assembly 70 is maintained in the recessed portion 60 by suitable cement or the like. Stud 84 extends downwardly from assembly 70 and is in electrical contact with plate 44'.

Tube mounting and ground stud assembly 70' is positioned in the recessed portion 60' of support 56' so that threaded opening 72' is positioned over opening 58'. Tube mounting and ground stud assembly 70" is positioned in the recessed portion 60" of support 56" so that threaded opening 72" is positioned over opening 58". Preferably, tube mounting and ground stud assemblies 70' and 70" are maintained in the recessed portions 60' and 60" respectively by suitable cement or the like. Assemblies 70' and 70" are provided with stud 80 and 88 extending upwardly therefrom.

A conventional signal circuit protector 78 is mounted in the housing and may be comprised of either a conventional gas tube such as the model 471A gas tube manufactured by Western Electric. If desired, the gas tube could be replaced by a conventional carbon arrestor. Tube 78 is threaded in opening 72' so that its input end is in electrical connection with assemlby 70'. The lower or output end of tube 78 is in electrical contact with one end of plate 44'. Stud 80 is electrically connected to the conductive wire 24.

A second protector unit 86 is also provided in the housing and is identical to the protector unit 78. Metal stud 88 on assembly 70" is electrically connected to the conductive wire 26. The lower or output end of tube 86 is in electrical contact with the outer end of plate 44'. Gas tubes 78 and 86 are designed to provide at least a momentary path to ground through the grounding stud 84 when a power surge of a predetermined magnitude is experienced in the wires 24 or 26. Stud 84 may be electrically connected to ground 32 if desired. Stud 84 is electrically connected to water pipe 18 by lead 34.

In the event that a sufficiently large current should occur in cable 22 such as would occur with a lightning strike or the like, the gas tube 74 will fire and will permit the momentary passage of current therethrough. If lightning should strike cable 22, excess current passing through lines 24 and 26 will not cause damage to equipment within the house due to the protectors 78 and 86.

Thus it can be seen that a novel protector device has been provided which combines a low voltage buried wire isolator and a signal circuit protector which will prevent spontaneous combustion of the material surrounding the metallic sheath 28 or the area near the sheath isolating the sheath from the circuit. The apparatus is preferably enclosed by means of a cover 92 maintained on the base 50 by means of nut 94 secured to stud 85.

Thus it can be seen that the apparatus of this invention accomplishes at least all of its stated objectives.

I claim:
1. A protector unit for a buried cable including a metal grounding sheath surrounding at least two conductive wires, comprising,
  a housing having an electrically conductive attachment means which is electrically connected to the metal grounding sheath,
  a first voltage protector means in said housing and having an input side and a discharge side and esigned to normally prevent the flow of electrical current therethrough which is below a predetermined value,
  a ground terminal in operative electrical contact with said input side of said first protector means, said ground terminal being connected to a grounding circuit, the discharge side of said first voltage protector means being electrically connected to said attachment means, a first circuit protector means in said housing and having an input side and a discharge side, the input side of said first circuit protector means being operatively electrically connected to one of said conductive wires and being designed to provide at least a momentary path to said ground terminal and the grounding circuit when a power surge is experienced in said one conductive wire, and a second circuit protector means in said housing and having an input side and a discharge side, the input side of said second circuit protector means being operatively electrically connected to the other of said conductive wires and being designed to provide at least a momentary path to said ground terminal and the grounding circuit when a power surge is experienced in said other conductive wire.

2. A protector unit for a buried cable including a metal grounding sheath surrounding a plurality of conductive wires, comprising, a housing having an electrically conductive attachment means which is electrically connected to the metal grounding sheath, a first voltage protector means in said housing and having an input side and a discharge side and designed to normally prevent the flow of electrical current therethrough which is below a predetermined value, a ground terminal inoperative electrical contact with said input side of said first protector means, said ground terminal being connected to a grounding circuit, the discharge side of said first voltage protector means being electrically connected to said attachment means, a plurality of circuit protector means in said housing, each having an input side and a discharge side, the input side of each said circuit protector means being operatively electrically connected to one of said plurality of conductive wires and being designed to provide at least a momentary path to said ground terminal and the grounding circuit when a power surge is experienced in one of said conductive wires.

* * * * *